Sept. 15, 1959
C. E. RHODES
2,904,201
ELEVATOR HAND TRUCK
Filed Dec. 30, 1957
2 Sheets-Sheet 1
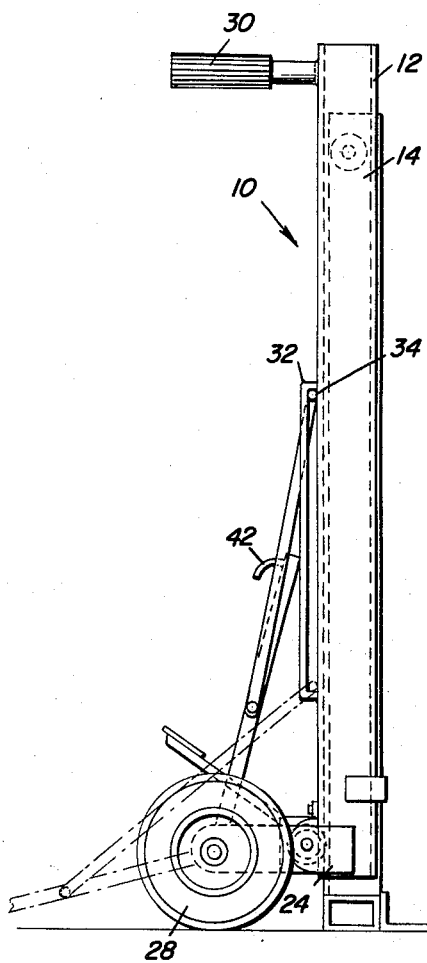
Fig.1
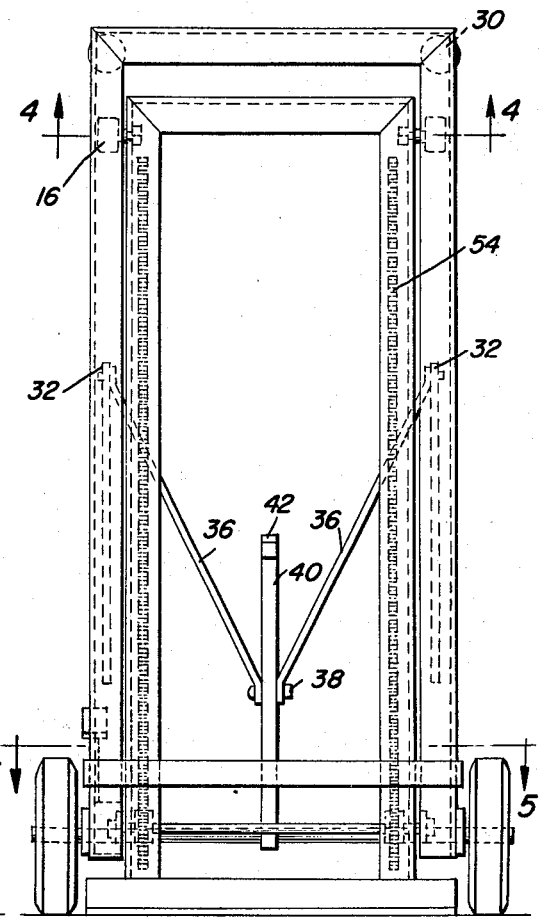
Fig.2
Fig.4
Chester E. Rhodes
INVENTOR.
BY
Attorneys Sept. 15, 1959     C. E. RHODES     2,904,201
ELEVATOR HAND TRUCK
Filed Dec. 30, 1957     2 Sheets-Sheet 2
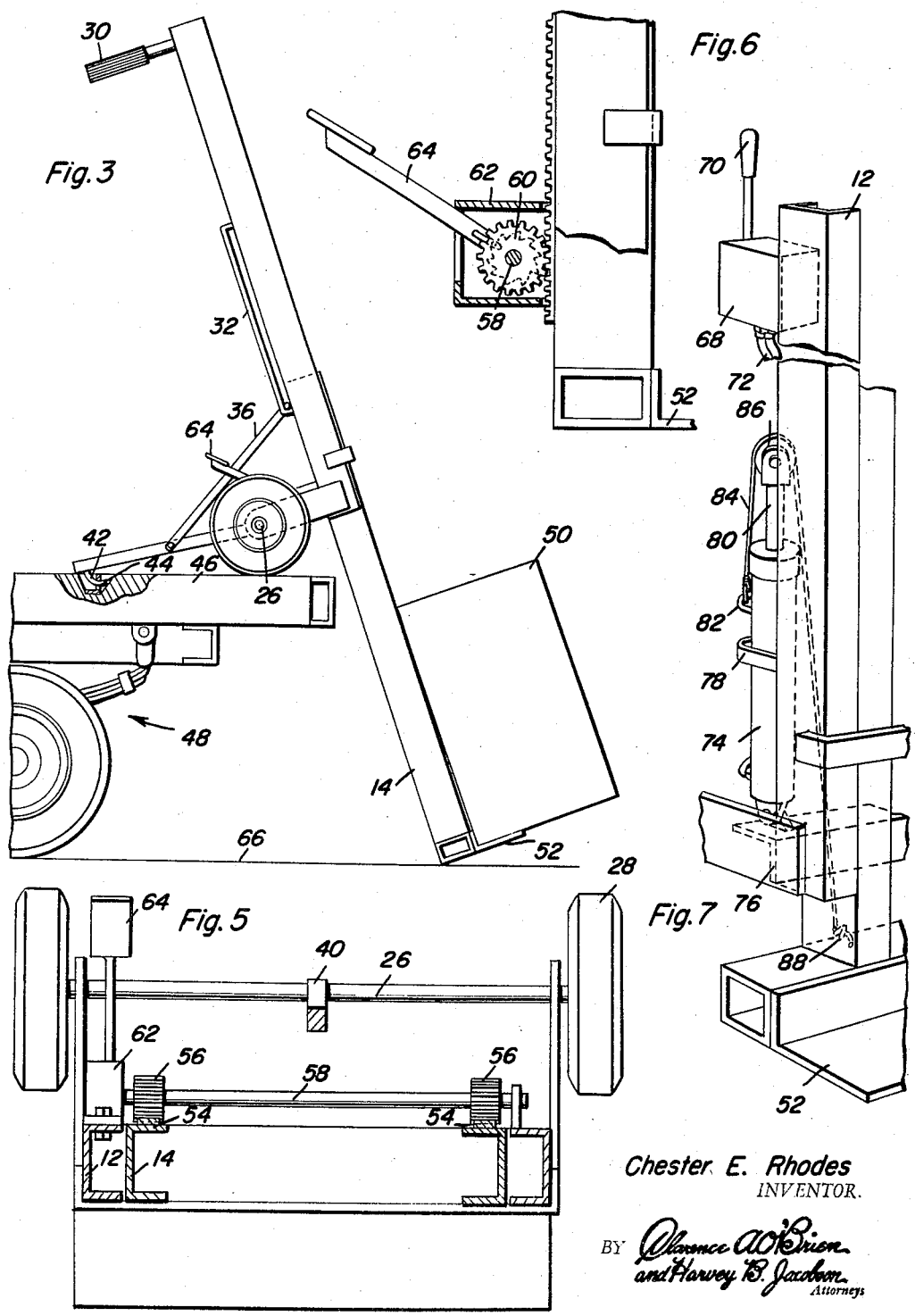
Chester E. Rhodes
INVENTOR.

United States Patent Office 2,904,201
Patented Sept. 15, 1959

2,904,201

ELEVATOR HAND TRUCK

Chester E. Rhodes, Santa Cruz, Calif.

Application December 30, 1957, Serial No. 705,918

5 Claims. (Cl. 214—515)

This invention relates generally to hand trucks and more particularly to a novel type of elevator hand truck.

It is the principal object of this invention to provide an elevator hand truck particularly adapted for use on a bed of a self-propelled truck.

It is a further object of this invention to provide a novel construction in hand trucks utilizing telescoping channel frames.

It is a further object of this invention to provide automatic means for telescoping the frame sections of this invention.

It is a still further object of this invention to provide novel brake means for counteracting the natural relative movement between the frame sections.

It is a still further object of this invention to provide novel hook means attached to the hand truck of this invention for maintaining the hand truck in a particular position relative to the bed of a self-propelled truck.

It is a still further object of this invention to provide an elevator hand truck particularly adapted for use with the bed of a self-propelled truck which is reliable, easy to operate, an relatively inexpensive to manufacture.

In accordance with the above stated objects, below is described an elevator hand truck comprising an inner and outer channel frame telescopically related. It is the intention of this invention to provide a projection on a portion of the inner frame for supporting weights. Furthermore, the inner frame is provided with a rack means which cooperate with hand brake means in the form of a gear for telescoping the frames selectively with the aid of the gravity. A hand pump is also included in this invention and is supported by the outer frame for telescoping the frame members in opposition to gravity. Still further means are provided on the hand truck of this invention for easily hooking the hand truck to the bed of a self-propelled truck whereby a weight or object supported by the projection on the inner frame of the hand truck can be lowered to the ground surface from the self-propelled truck bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of this invention showing the hook affixed to the undersurface of the hand truck and also showing the hook in phantom lines in position to cooperate with the bed of a self-propelled truck;

Figure 2 is a front elevational view of the invention;

Figure 3 is a further elevational view of this invention shown in cooperating relationship with self-propelled truck;

Figure 4 is a sectional view showing the guide means between the inner and outer channel frames taken substantially along the plane 4—4 of Figure 2;

Figure 5 is a further sectional view of a portion of this invention taken substantially along the plane 5—5 of Figure 2 showing the manual brake means;

Figure 6 is a side elevational view of the manual brake means of this invention partly broken away; and Figure 7 is a perspective view of a portion of this invention showing the manual pump means for telescoping the frame sections.

With continuing reference to the drawings, numeral 10 generally represents the elevator hand truck of this invention including an outer frame channel member 12 and an inner frame channel member 14. The inner frame 14 and outer frame 12 are both constructed of channel iron and are telescopically related. A guide roller 16 is inserted in the outer channel 12 and adapted to roll therein. The guide roller 16 is connected through a shaft 18 where it is threadedly engaged with a nut 20 to hold the roller 16 in fixed relationship relative to inner channel 14. A spacer 22 is concentrically placed on shaft 18 for maintaining the spacing between the channel members. A ball bearing connection, or equivalent means may exist between the shaft 18 and the rotatable wheel 16.

Depending legs 24 are supported from the outer surfaces of outer channel 12. The depending legs 24 support a shaft 26 therebetween which rotatably supports on either end thereof wheels 28 for providing rolling movement to the hand truck 10. A pair of handles 30 depend from the outer frame 12 at its upper portion as shown in Figure 1 for transmitting the proper force to the hand truck for its rolling movement on wheels 28. Furthermore, the handles 30 provide support means when it is desired to place the hand truck in a horizontal position.

Depending from the undersurface of outer frame 12 are a pair of slotted members 32 comprising a track for guiding the movement of pin 34 therein. The pins 34 are permanently affixed to links 36. The links are supported from either side of outer channel 12 and are pivotally connected at 38 with a hook member 40. The pivotal connection 38 includes the two links 36 sandwiching the hook 40 at its mid-point. The hook 40 includes the hook portion 42 at one end thereof. This hook portion 42 is adapted to cooperate with a hook in the bed 46 of self-propelled truck 48. The hook member 40 is terminally and pivotally connected to shaft 26 which rotatably supports the wheels 28. The operation of the links 36 and hook member 40 should now be apparent. Assume, that the hand truck 10 is being rolled in a relatively horizontal position by a person gripping the handles 30 on rotatable wheels 28. The hook member 40 will be in the position shown by the solid lines in Figure 1. That is, the hook member 40 and links 36 will be in a virtually closed position close to the undersurface of the frame members 12 and 14. An object or weight 50 will be supported by projection 52 securely attached to inner channel frame 14. When the operator of the hand truck 10 approaches the rear of the truck bed 46 of self-propelled truck 48, he will manually engage the hook portion 42 of the hand truck with the hook 44 of the self-propelled truck 48. As will be apparent in Figure 3, the hand truck 10 may then be tipped about the shaft 26 connecting wheels 28.

The inner channel 14 includes teeth 54 along the length thereof which comprise rack means. The teeth 54 on each side of the channel frame 14 cooperate with gear members 56 which are fixedly attached to transmitting rod 58. The rod 58 fixedly supports a ratchet 60 in the box 62 which communicates operatively with the manual handle 64. It will be seen, that when the hand truck 10 is tipped into position as shown in Figure 3, that is when it is rotated about the shaft 26 while maintained on the truck bed by the cooperation between hooks 42 and 44, the inner frame 14 will have a tendency due to gravity to fall from the outer frame 12. This tendency, will be compensated for as long as handle 64 engages ratchet 60 which is fixedly attached to transmitting rod 58. As long as the transmission rod 58 does not rotate the gears 56 cannot rotate and so there can be no longitudinal movement of channel 14 due to the cooperation between teeth 54 and gears 56. However, when handle 64 is disengaged from ratchet 60 the effects of gravity are no longer compensated for and the inner frame 14 will tend to telescope from within the outer frame 12. It will be apparent that the inner frame 14 may be selectively positioned relative to the outer frame 12 by these brake means.

The handle 64 is in a position where it is easily actuated by foot pressure by an operator standing on the truck bed 46 of self-propelled truck 48. It can be seen therefore that a load 50 carried by projection 52 supported by inner frame 14 can be simply and easily brought to the ground surface 66.

The inclusion in this invention of manual pump 68 allows the lifting of a load 50 to the bed 46 of the self-propelled truck 48 in a likewise simple manner. As is shown in Figure 7, a manual pump 68 having an actuating handle 70 is supported from outer frame 12. Cables 72 transmit the hydraulic pressure established by actuation of the handle 70 to a hydraulic cylinder 74. The hydraulic cylinder 74 is supported from the outer frame 12 by an angle iron 76 and bracket 78. The hydraulic cylinder 74 includes piston 80 which moves longitudinally in the cylinder 74 in response to pressure established by actuation of the handle 70. An eye 82 is affixed to the hydraulic cylinder 74 and a chain 84 is affixed thereto. The chain 84 loops over a pulley 86 attached to the piston 80 and is terminally affixed at 88 to the inner frame 14. It should be clear that upon establishment of pressure through the handle 70 and hand pump 68 and resulting longitudinal movement of the piston 80 and cylinder 74, the chain 84 will transmit longitudinal or lifting force to the inner frame 14 whereby it will move relative to the outer frame 12. The handle 70 is so situated on the outer frame 12 that it is actuatable by an operator standing on the truck bed 46 of self-propelled truck 48 by either hand or foot.

Above has been described all the necessary elements for a novel construction in elevator hand trucks particularly adapted for use on the bed of a self-propelled truck for moving loads on the bed and for lifting and lowering loads to and from the bed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An elevator hand truck comprising an outer frame, an inner frame telescopically related to said outer frame, a support member attached to the bottom of said frame for supporting weights, rack means fixed on said inner frame, gear means rotatably supported by said outer frame and cooperating with said rack means, a brake pedal detachably connected to said gear for locking said gear whereby said inner frame will be locked relative to said outer frame, a slot attached to the undersurface of said frame, a link pivotally and slidably mounted in said slot, a hook pivotally connected to said outer frame, said link terminally and pivotally connected to said hook near its midpoint whereby the hook may cooperate with a truck bed for maintaining the hand truck in a tipped position or the hook may be lifted to a position proximate the undersurface of said outer frame to facilitate rolling movement of said hand truck.

2. An elevator hand truck comprising an outer frame, an inner frame telescopically related to said outer frame, a support member attached to the bottom of said frame for supporting weights, rack means fixed on said inner frame, a rotatable rod carried by said outer frame, gear means fixed to said rod and cooperating with said rack means, a ratchet wheel fixed to said rod, brake means supported adjacent said ratchet wheel for cooperating with said ratchet wheel for locking said rod whereby said inner frame will be locked relative to said outer frame, a slot attached to the undersurface of said frame, a link pivotally and slidably mounted in said slot, a hook pivotally connected to said outer frame, said link terminally and pivotally connected to said hook near its midpoint whereby the hook may cooperate with a truck bed for maintaining the hand truck in a tipped position or the hook may be lifted to a position proximate the undersurface of said outer frame to facilitate rolling movement of said hand truck.

3. An elevator hand truck comprising an outer frame, an inner frame telescopically related to said outer frame, each of said frames including opposed channel members, rack means fixed on said inner frame outwardly of said channel, gear means rotatably supported by said outer frame and cooperating with said rack means, a brake pedal detachably connected to said gear for locking said gear whereby said inner frame will be locked relative to said outer frame, a slot attached to the undersurface of said frame, a link pivotally and slidably mounted in said slot, a hook pivotally connected to said outer frame, said link terminally and pivotally connected to said hook near its midpoint whereby the hook may cooperate with a truck bed for maintaining the hand truck in a tipped position or the hook may be lifted to a position proximate the undersurface of said outer frame to facilitate rolling movement of said hand truck.

4. An elevator hand truck comprising an outer frame, an inner frame telescopically related to said outer frame, each of said frames including opposed channel members, rack means fixed on said inner frame outwardly of said channel, a rotatable rod carried by said outer frame, gear means fixed to said rod and cooperating with said rack means, a ratchet wheel fixed to said rod, brake means supported adjacent said ratchet wheel for cooperating with said ratchet wheel for locking said rod whereby said inner frame will be locked relative to said outer frame, a slot attached to the undersurface of said frame, a link pivotally and slidably mounted in said slot, a hook pivotally connected to said outer frame, said link terminally and pivotally connected to said hook near its midpoint whereby the hook may cooperate with a truck bed for maintaining the hand truck in a tipped position or the hook may be lifted to a position proximate the undersurface of said outer frame to facilitate rolling movement of said hand truck .

5. An elevator hand truck comprising an outer frame, an inner frame telescopically related to said outer frame, each of said frames including opposed channel members, a shaft fixed to the bight portion of said inner channel and extending into said outer channel, a rotatable guide roller carried terminally by said shaft, said roller adapted to roll within said outer channel for facilitating the telescopic movement of said frames, rack means fixed on said inner frame outwardly of said channel, gear means rotatably supported by said outer frame and cooperating with said rack means, a brake pedal detachably connected to said gear for locking said gear whereby said inner frame will be locked relative to said outer frame, a slot attached to the undersurface of said frame, a link pivotally and slidably mounted in said slot, a hook pivotally connected to said outer frame, said link terminally and pivotally connected to said hook near its midpoint whereby the hook may cooperate with a truck bed for maintaining the hand truck in a tipped position or the hook may be lifted to a position proximate the undersurface of said outer frame to facilitate rolling movement of said hand truck.

References Cited in the file of this patent

UNITED STATES PATENTS

| | | |
|---|---|---|
| 342,950 | Caldwell | June 1, 1886 |
| 474,653 | Deffler | May 10, 1892 |
| 513,155 | Stanford | Jan. 23, 1894 |
| 560,056 | Arnold | May 12, 1896 |
| 2,242,891 | Light | May 20, 1941 |
| 2,560,131 | Sasgen | July 10, 1951 |
| 2,594,076 | Schlein | Apr. 22, 1952 |
| 2,706,569 | Butler | Apr. 19, 1955 |
| 2,711,260 | Butler | June 21, 1955 |